United States Patent [19]
Keener et al.

[11] Patent Number: 5,174,684
[45] Date of Patent: Dec. 29, 1992

[54] APPARATUS AND METHOD OF REMOVING CABLE

[76] Inventors: Ricky R. Keener, Rte. 1 Box 169-E; William W. Ridenour, Rte. 4 Box 287-B, both of Morgantown, W. Va. 26505

[21] Appl. No.: 833,655

[22] Filed: Feb. 11, 1992

[51] Int. Cl.$^5$ .............................................. F16L 1/00
[52] U.S. Cl. .................................... 405/154; 156/48; 254/29 R; 405/156; 405/184
[58] Field of Search ............... 405/154, 156, 157, 184, 405/173; 138/97, 98; 156/48; 254/29 R

[56]         References Cited
         U.S. PATENT DOCUMENTS

| | | | |
|---|---|---|---|
| 2,297,164 | 9/1942 | Rainwater . | |
| 4,018,058 | 4/1977 | Eichenseher et al. | 405/154 |
| 4,553,877 | 11/1985 | Edvardsen | 405/154 |
| 4,685,831 | 8/1987 | Mahoney | 405/156 |
| 4,783,226 | 11/1988 | Senn | 156/48 |

FOREIGN PATENT DOCUMENTS 0068997 6/1979 Japan ................................... 405/154

*Primary Examiner*—Dennis L. Taylor
*Attorney, Agent, or Firm*—Richard C. Litman

[57]         ABSTRACT

A method of and apparatus for removing underground telecommunications cable which involves excavating the earth at predetermined intervals, such as 100 to 150 feet, to expose a segment of cable, severing the exposed segment of cable, placing an air-tight cap on each end of the cable to be removed, evacuating the air out of the cable until the cable has collapsed via a vacuum device coupled to one of the caps, removing the caps from both ends and hitching a winch to one end, and applying a pulling force with the winch. If the cable is being removed for scrap, it may be necessary to cut the cable into pieces of a size which is sufficient for transportation. It may also be deemed necessary to remove and reapply the hitch as the cable is being removed. The same method may be used to remove telecommunications cable from manholes without the excavation step.

8 Claims, 3 Drawing Sheets

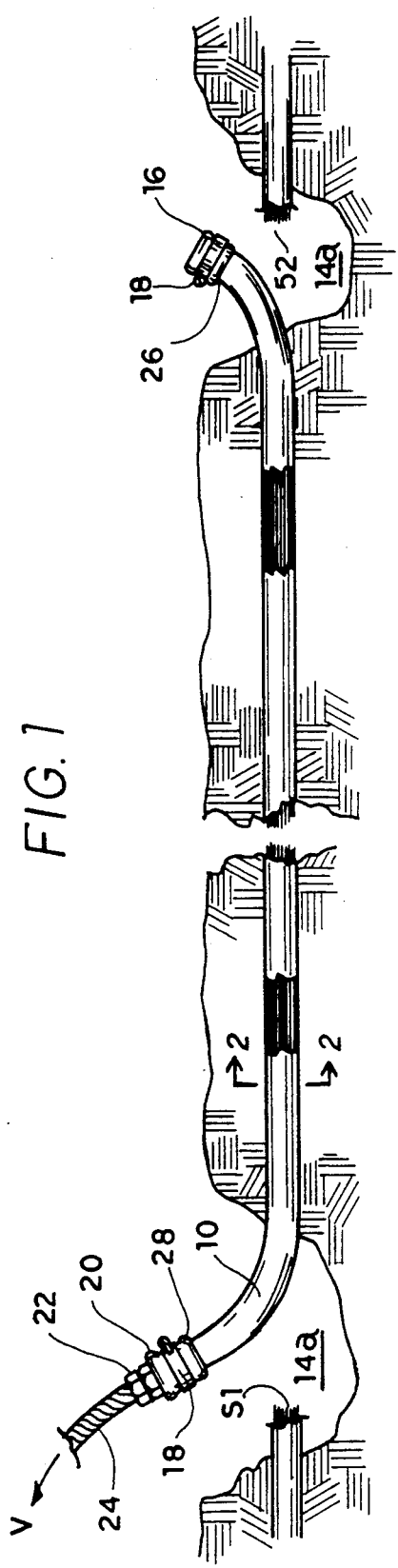
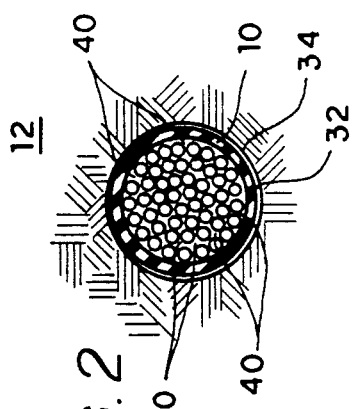
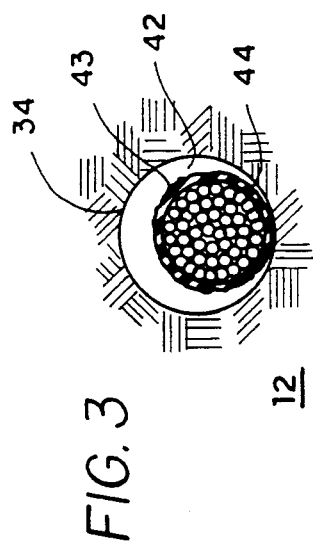
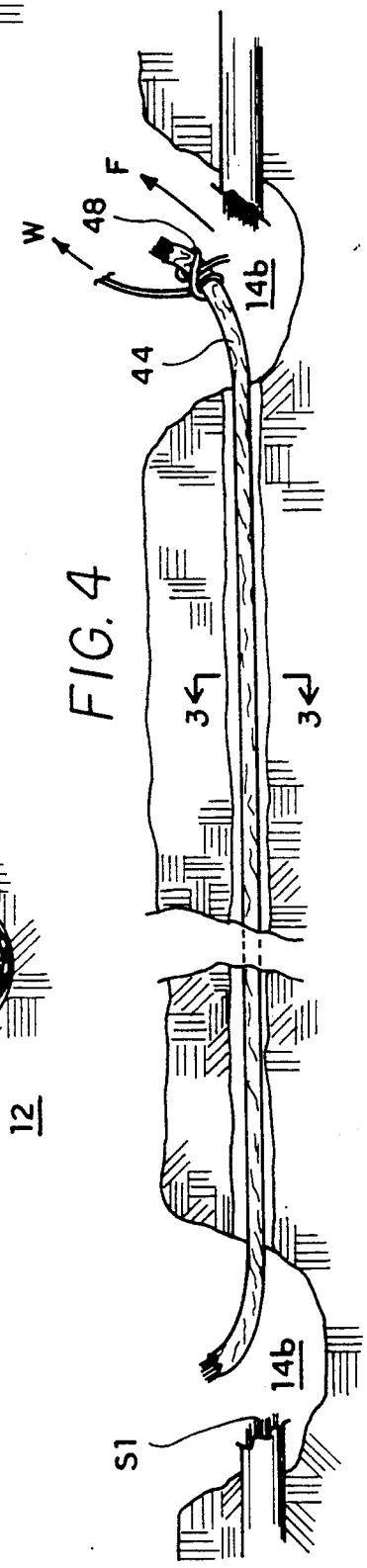
FIG. 1
FIG. 2
FIG. 3
FIG. 4

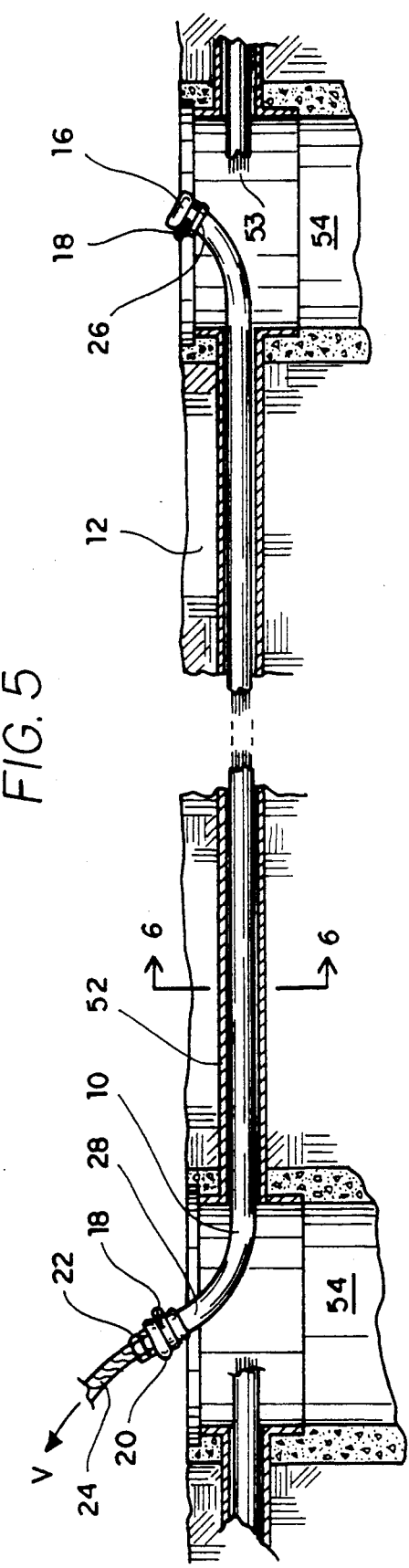
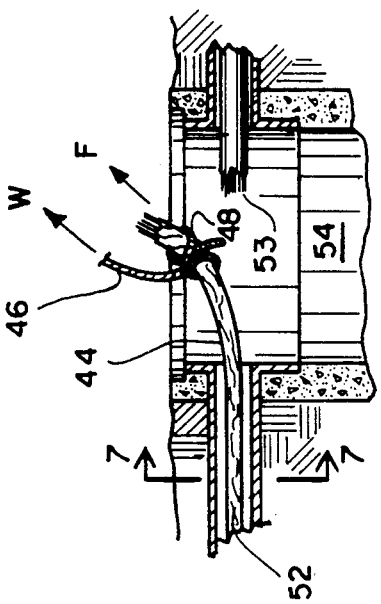
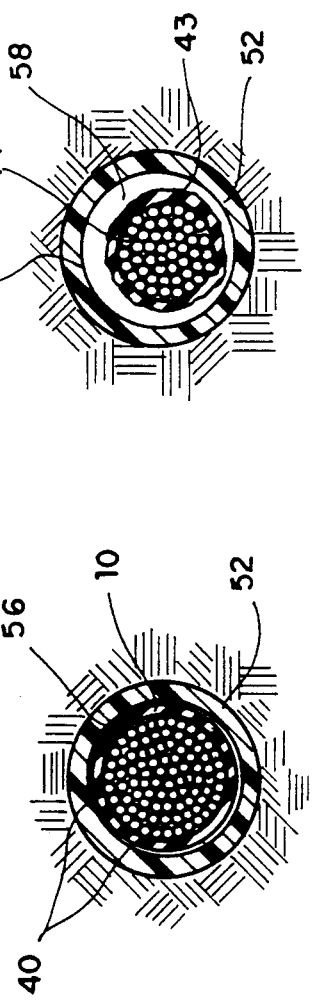

APPARATUS AND METHOD OF REMOVING CABLE

BACKGROUND OF THE INVENTION

1. Field of the Invention

The present invention relates to a method of retrieving underground cable or removing cable from conduit and more particularly, multi-conductor cable, such as telecommunication cable.

2. Description of Prior Art

During the installation process, a telecommunications cable is pressurized with air as a measure of protection. The pressurization of this cable and the settlement of the earth around it or the filling of the conduit with mud over a period of time creates friction between the cable and its surroundings which makes it difficult to remove. When the underground telecommunication cable or the cable routed in conduit is no longer in service, for example, when a communication system is being expanded when a more advanced system, such as a fiber optic system, is installed, the previous service cable is abandoned underground or within the conduit because of the cost involved in removing it.

There are methods known for removing underground cables. However, no methods currently in use incorporate the collapse of the cable or the reduction of the diameter of the cable through an evacuation process.

U.S. Pat. No. 2,297,164 issued Sep. 29, 1942 to John E. Rainwater discloses an apparatus for pulling and replacing pipes by means of a cable and a device attached to the cable whereby a pipe may be pulled and replaced.

U.S. Pat. No. 4,018,058 issued Apr. 19, 1977 to Heinrich Eichenseher et al. discloses a method of recovering non-ferrous metal conductors from a sheathed cable laid in the earth which includes excavating the earth at intervals, severing the cables, and withdrawing the cable with the aid of a pulling force.

U.S. Pat. No. 4,685,831 issued Aug. 11, 1987 to Robert L. Mahoney discloses a cable removing apparatus and a method utilizing the apparatus to remove continuous lengths of underground cable.

None of the above inventions and patents, taken either singly or in combination, is seen to describe the instant invention as claimed.

SUMMARY OF THE INVENTION

The present invention relates to a method of retrieving multi-conductor cable, specifically telecommunication cable, from underground or from a section of conduit. The method includes excavating the earth at intervals to expose segments of cables at these intervals. The exposed cable is severed. A cap is secured on one end of the cable to provide an airtight seal within the cable. Another cap is fastened to the opposite end of the cable also to provide an airtight seal. The second cap includes a coupling to facilitate the connection of a vacuum device. A vacuum device is connected to the cable via the coupling found on the second cap and a vacuum is applied to reduce the cross-section of the cable. Over a short period of time, the cable collapses or the cross-section is reduced from being evacuated by the vacuum device. After the evacuation process or once the cable is collapsed sufficiently, the caps are removed and a chain from a winch is fastened via a half hitch to one end of the cable. The other end of the winch is secured to an unsevered segment of cable to provide a stationary support for the winch. A pulling force is applied by the winch to remove the cable. As the cable is removed, it can be cut in lengths appropriate for transporting. As an alternative, cable is removed from conduit by severing the cable at intervals within a manhole. The same technique is applied where the cable is capped off at both ends to provide an airtight seal, the cable is collapsed by removing the air with a vacuum device, and after the cross-section is reduced sufficiently, the cable is pulled out of the conduit by a winch and if necessary, segmented for transportation purposes.

Accordingly, one object of the present invention is to provide a method of removing multi-conductor cable from the ground without the aid of heavy duty excavating equipment.

Another object of the present invention is to provide a method of removing multi-conductor cable from the ground or from a section of conduit by collapsing or reducing the cross-section of the cable by removing the air through an evacuation process.

These and other objects of the present invention will become readily apparent upon further review of the following specification and drawings.

BRIEF DESCRIPTION OF THE DRAWINGS

FIG. 1 is a partially broken environmental view showing the evacuation of a severed cable in compliance with the evacuation step of the method of the present invention according to a preferred embodiment.

FIG. 2 is an environmental cross-sectional view taken along line 2—2 of FIG. 1 of the multi-conductor cable prior to the evacuation step according to the method of the present invention according to the preferred embodiment.

FIG. 3 is an environmental cross-sectional view taken along the line 3—3 in FIG. 4 of the multi-conductor cable after the evacuation step according to the method of the present invention according to the preferred embodiment.

FIG. 4 is a partially broken environmental cross-sectional view showing the pulling of the cable in compliance with the pulling step of the method of the present invention according to the preferred embodiment.

FIG. 5 is a partially broken environmental cross-sectional view showing the evacuation of a severed cable in compliance with the evacuation step of the method of the present invention according to an alternative embodiment.

FIG. 6 is an environmental cross-sectional view taken along the line 6—6 in FIG. 5 of the multi-conductor cable prior to the evacuation step according to the method of the present invention according to the alternative embodiment.

FIG. 7 is an environmental cross-sectional view taken along the line 7—7 of FIG. 8 of the multi-conductor cable after the evacuation step according to the method of the present invention according to the alternative embodiment.

FIG. 8 is a partially broken environmental cross-sectional view showing the pulling of the cable in compliance with the pulling step of the method of the present invention according to the alternative embodiment.

DETAILED DESCRIPTION OF THE PREFERRED EMBODIMENTS

Figure 10:
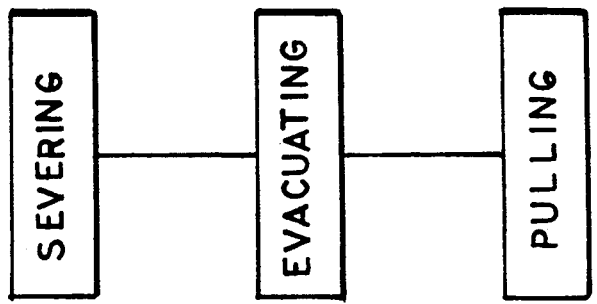
FIG. 10 is a block diagram of the method of the alternative embodiment of the present invention.

The present invention according to a preferred embodiment, as illustrated in FIGS. 1-4 and FIG. 9, involves a multi-conductor cable 10 partially buried in the earth 12. In agreement with the method of the present invention, the earth 12 is excavated (step 100) at intervals to expose the multi-conductor cable 10; two such intervals are illustrated by the holes 14a and 14b. The multi-conductor cable 10 exposed is severed (step 101) at points S1 and S2. The segment of the multi-conductor cable 10 to be recovered is capped at a first end 26 by a first cap 16. The first cap 16 is secured to the multi-conductor cable 10 by a hose clamp 18 to provide an airtight seal with the multi-conductor cable 10. The same segment of multi-conductor cable 10 is then capped at a second end 28 by a second cap 20 which is also secured to the multi-conductor cable 10 by a hose clamp 18 to provide and airtight seal with the multi-conductor cable 10. The second cap 20 includes a coupling 22 to facilitate the connection of a conventional vacuum device 30 (or V) via the vacuum line 24.

Figure 9:
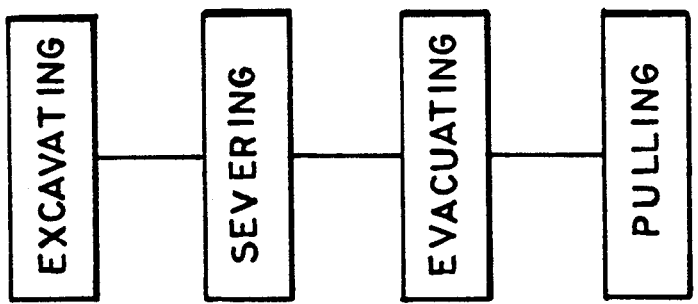
FIG. 9 is a block diagram of the method of the preferred embodiment of the present invention.

FIG. 2 and FIG. 9 shows the original cross-section of the multi-conductor cable 10 prior to the evacuation of air by the vacuum device (step 102). A snug fit relationship exists between the outside surface 32 of the cable 10 and the surface 34 of the earth 12 around the multi-conductor cable 10. The snug fit relationship creates friction between the multi-conductor cable 10 and the earth 12 which makes the multi-conductor cable 10 difficult to pull or to remove from the earth 12.

During the evacuation step (step 102), as shown in FIGS. 2-3 and FIG. 9, the cross-section (shown in FIG. 2) of the multi-conductor cable 10 is reduced to provide a collapsed cross-section (shown in FIG. 3) by evacuating the air 40 from the multi-conductor cable 10. After the evacuation step (step 102), a space 42 is provided which is defined by and between the outside surface 43 of the collapsed multi-conductor cable 44 and the surface 34 of the earth 12 surrounding the collapsed multi-conductor cable 44. This space 42 lessens the friction between what is now a collapsed multi-conductor cable 44 and the surface 34 of the earth 12 significantly enough to enable the collapsed multi-conductor cable 44 to be removed from the earth 12 with relative ease (step 103).

According to the preferred embodiment, as shown in FIG. 4 and FIG. 9, a chain 46 is wrapped around the collapsed multi-conductor cable 44 and secured by a half hitch 48 which tightens with tension or as the chain 46 is pulled by a conventional winch W. The first and second caps 16,20 are removed from the segment of collapsed multi-conductor cable 44; the winch W is activated to apply force in the direction F to pull to collapsed multi-conductor cable 44 from the earth 12. As the pulling step (step 103) is accomplished it may be necessary to remove and reapply the chain 46 depending on the length between the intervals or holes 14a,14b and if the collapsed multi-conductor cable 44 is to be cut into lengths suitable for transportation purposes.

An alternative embodiment, according to FIG. 5 and FIG. 10, involves a multi-conductor cable 10 in a section of conduit 52 buried beneath the earth 12. In agreement with the method of the present invention, a transition is made by the multi-conductor cable 10 within a manhole 54 from one section of conduit 52 to another section of conduit 52 whereby the multi-conductor cable 10 is exposed; two such manholes 54 are illustrated. The multi-conductor cable 10 exposed is severed at points S2 and S3 (step 200). The segment of the multi-conductor cable 10 to be recovered is capped at a first end 26 by a first cap 16. The first cap 16 is secured to the multi-conductor cable 10 by a hose clamp 18 to provide an airtight seal with the multi-conductor cable 10. The same segment of multi-conductor cable 10 is then capped at a second end 28 by a second cap 20 and is also secured to the multi-conductor cable 10 by a hose clamp 18 to provide and airtight seal with the multi-conductor cable 10. The second cap 20 includes a coupling 22 to facilitate the connection of a vacuum device 30 (or V) via the vacuum line 24.

FIG. 6 and FIG. 10 show the original cross-section 30 of the multi-conductor cable 10 prior to the evacuation step (step 100). A snug fit relationship exists between the outside surface 32 of the cable 10 and the inside surface 56 of the conduit 52 around the multi-conductor cable 10. The snug fit relationship creates friction between the multi-conductor cable 10 and the conduit 52 which makes the multi-conductor cable 10 difficult to pull or to remove from the conduit 52.

During the evacuation step (step 201), as shown in FIG. 7 and FIG. 10, the cross-section (shown in FIG. 6) of the multi-conductor cable 10 is reduced to provide a collapsed cross-section (shown in FIG. 7) by evacuating the air 40 from the multi-conductor cable 10. After the evacuation step (step 201), a space 58 is provided which is defined by and between the outside surface 43 of the collapsed multi-conductor cable 44 and the inside surface 56 of the conduit 52 surrounding the collapsed multi-conductor cable 44. This space 58 lessens the friction between what is now a collapsed multi-conductor cable 44 and the inside surface 56 of the conduit 52 significantly enough to enable the collapsed multi-conductor cable 44 to be removed from the conduit 52 with relative ease (step 202).

As shown in FIG. 8 and FIG. 10, chain 46 is wrapped around the collapsed multi-conductor cable 44 and secured by a half hitch 48 which tightens with tension or as the chain 46 is pulled by the winch W. The first and second caps 16,20 are removed from the segment of collapsed multi-conductor cable 44; the winch W is activated to apply force in the direction F to pull the collapsed multi-conductor cable 44 from the conduit 52. As the pulling step (step 201) is accomplished it may be necessary to remove and reapply the chain 46 depending on the length between the intervals or manholes 54 and if the collapsed multi-conductor cable 44 is to be cut into lengths suitable for transportation purposes.

It is to be understood that the present invention is not limited to the embodiments described above, but encompasses any and all embodiments within the scope of the following claims.

We claim:

1. A method of removing underground pressurized cable comprising the steps of:
   a. exposing at least two segments of cable to provide a first exposed segment of cable and a second exposed segment of cable;
   b. severing the first and second segments of the cable to provide a single section of cable having a first and second end defined by the severed first and second segments;

c. sealing the first and second ends of the single section of cable to provide an airtight seal;

d. evacuating the air from the single section of cable to reduce the cross-section of the single section of cable; and e. pulling the single section of cable from the earth.

2. The method according to claim 1, wherein said exposing step further comprises excavating the earth to expose the segments of cable at a plurality of intervals.

3. The method according to claim 1, wherein said exposing step further comprises removing a plurality of manhole covers to expose the segments of cable at a plurality of intervals.

4. The method according to claim 1, wherein said sealing step further comprises the steps of:

a. capping the first and second end of the single section of cable with a first and second cap, each cap providing an airtight seal, wherein at least one of said first cap and said second cap includes a coupling;

b. clamping the first and second caps to the first and second ends of the single section of cable, respectively, with a clamp; and c. connecting a vacuum device to the coupling provided on said at least one of the first cap and the second cap furnished in said capping step.

5. The method according to claim 1, wherein said evacuating step further comprises the steps of:

a. connecting a vacuum device to the coupling provided on said one of the first cap and the second cap furnished in said capping step;

b. operating the vacuum device until the single section of cable has collapsed substantially;

c. disconnecting the vacuum device after the single section of cable has collapsed substantially; and d. removing the first and second caps from the first and second ends of the single section of cable after the single section of cable has collapsed substantially.

6. The method according to claim 1, wherein said pulling step further comprises the steps of:

a. fastening a winch to one of the first and second end of the single section of the cable;

b. operating the winch to pull the single section of cable from the ground; and c. unfastening the winch from the one of the first and second end of the single section of cable.

7. The method according to claim 1, wherein the pulling step further comprises cutting the single section of cable in pieces suitable for transporting.

8. An apparatus for removing air from a pressurized underground cable having a first and second end exposed, said apparatus comprising:

a first cap;

a second cap including a coupling being fastened thereon;

a first and second clamping means to secure said first and second caps, respectively, to said first and second ends of said cable to provide an airtight seal;

a vacuum device including a means to couple said vacuum device to said coupling fastened on said second cap; whereby said vacuum device is operated to evacuate air from the cable until the cable has collapsed substantially; and a winch cable connected between said collapsed cable and a winch, whereby said collapsed cable may be pulled from the ground.

* * * * *